US006732400B1

(12) United States Patent
Zimmer

(10) Patent No.: US 6,732,400 B1
(45) Date of Patent: May 11, 2004

(54) WINDSCREEN WIPER ARRANGEMENT FOR VEHICLES

(75) Inventor: Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 396 days.

(21) Appl. No.: 09/868,005

(22) PCT Filed: Oct. 12, 2000

(86) PCT No.: PCT/DE00/03587

§ 371 (c)(1),
(2), (4) Date: Jun. 12, 2001

(87) PCT Pub. No.: WO01/28826

PCT Pub. Date: Apr. 26, 2001

(30) Foreign Application Priority Data

Oct. 20, 1999 (DE) .......................... 199 50 614

(51) Int. Cl.[7] ................ B60S 1/24; B60S 1/06
(52) U.S. Cl. .............. 15/250.3; 15/250.27; 74/42; 74/43
(58) Field of Search ............ 15/250.3, 250.31, 15/250.21, 250.23, 250.14, 250.27; 74/42, 43

(56) References Cited

U.S. PATENT DOCUMENTS

| | | | | |
|---|---|---|---|---|
| 1,854,074 A | * | 4/1932 | Slingerland et al. ..... | 15/250.27 |
| 3,125,777 A | * | 3/1964 | Leininger ................ | 15/250.14 |
| 3,226,755 A | | 1/1966 | Fox et al. ................ | 15/250.14 |
| 3,656,208 A | * | 4/1972 | Kato et al. ............... | 15/250.31 |
| 4,516,288 A | * | 5/1985 | Fizyta et al. ............. | 15/250.04 |
| 4,672,709 A | * | 6/1987 | Licata et al. ............. | 15/250.27 |
| 5,920,948 A | | 7/1999 | Hayashi et al. .......... | 15/250.21 |
| 6,591,444 B1 | * | 7/2003 | Hoshino .................. | 15/250.3 |

FOREIGN PATENT DOCUMENTS

DE       44 44 066 A      6/1996

* cited by examiner

*Primary Examiner*—Gary K. Graham
(74) *Attorney, Agent, or Firm*—Michael J. Striker

(57) ABSTRACT

A wiper system (1) for vehicles, having at least one wiper lever assembly (7) that has at least one wiper arm (26) and that has a first pivot lever (9) that can be coupled in a manner fixed against relative rotation to a stationary first shaft (19) and a second pivot lever (11) that is freely rotatable about a stationary second shaft (23), is proposed. The first pivot lever (9) is connected via a first joint (15) and the second pivot lever (11) via a second joint (17) to the coupling element (13). The wiper system (1) furthermore has a drive device (29), which has a drive shaft (31) disposed at a distance from the first and second shafts (19, 23); with the aid of the drive shaft, at least one toggle link (37) can be shifted in oscillating fashion, and the toggle link (37) is connected via a joint (43) to a coupling part (45) that is coupled to the first shaft (19) in a manner fixed against relative rotation.

8 Claims, 4 Drawing Sheets

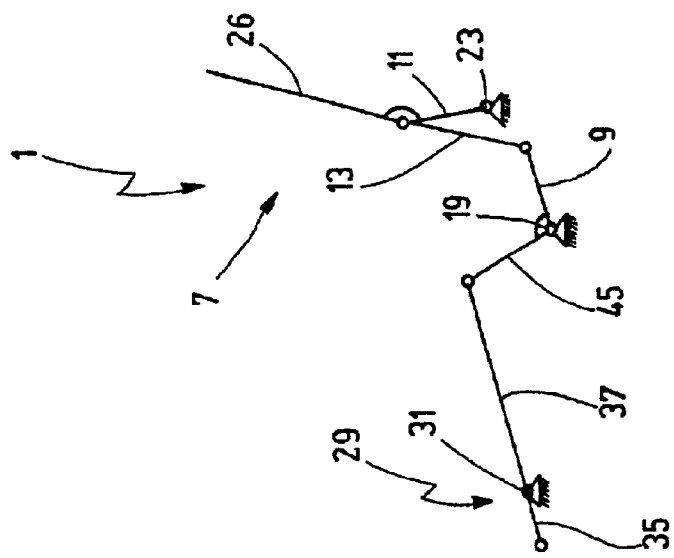
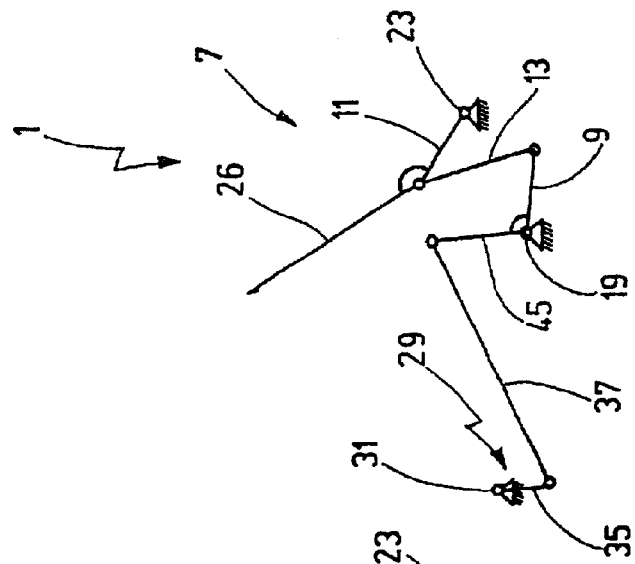
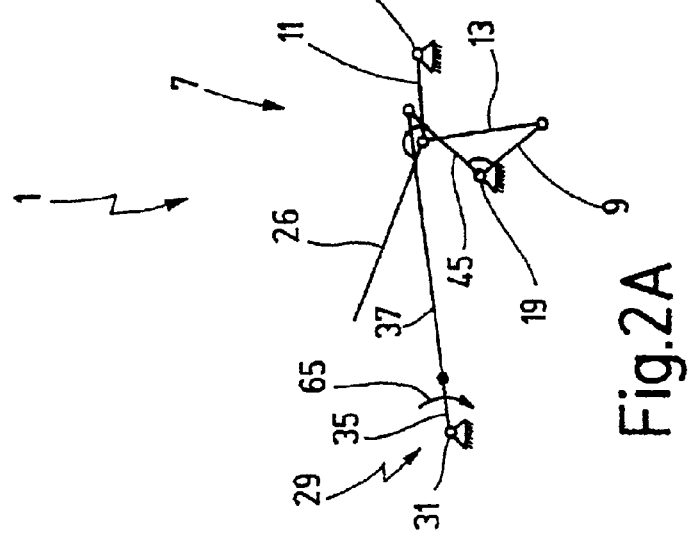

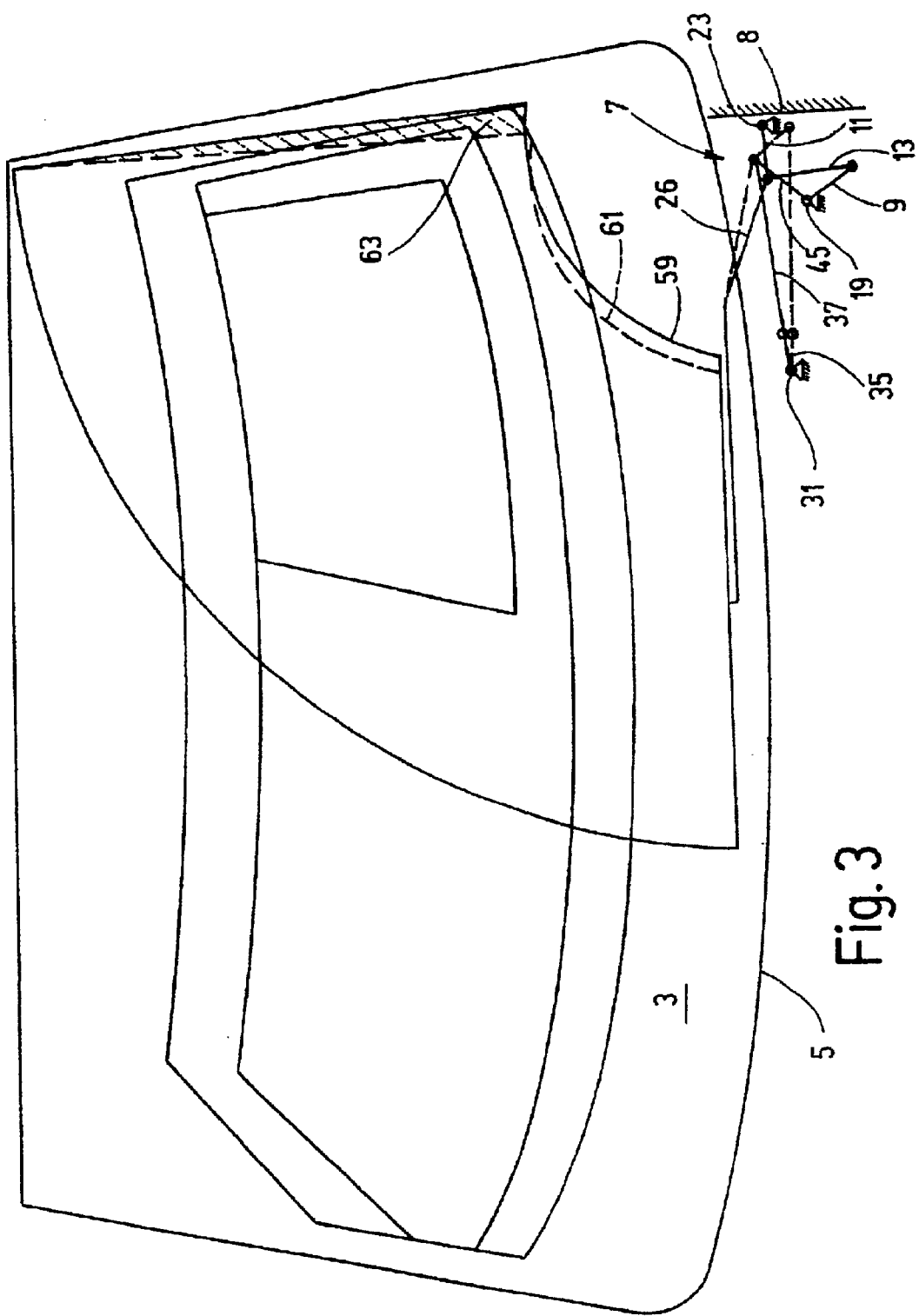

WINDSCREEN WIPER ARRANGEMENT FOR VEHICLES

BACKGROUND OF THE INVENTION

The invention relates to a wiper system for vehicles, having at least one wiper lever assembly that has at least one wiper arm.

Wiper systems of this type are known. They are used for instance to clean the front window of a vehicle, and they include a four-bar wiper lever assembly, which has at least one wiper arm and which enables a reciprocating-pivoting motion of the wiper arm. In addition, wiper lever assemblies are known in which the wiper arm is fastened to a pivot lever that in turn is coupled in a manner fixed against relative rotation to a shaft that can be acted upon by a torque. In this version, the wiper arm is pivoted solely with the shaft, which is stationary; that is, the wiper arm does not execute any reciprocating motion.

The wiper system is mounted on the vehicle body below the front window, and the shaft with which a pivot lever that has the wiper arm is coupled in a manner fixed against relative rotation is disposed in the region of a connection point between an A pillar, an end wall, and an outer skin on the side of the vehicle body. Since this region of the vehicle body is subject to severe stress in a collision, multiple metal panels are typically provided here to stiffen the vehicle body. A hinge of an engine hood is typically mounted in this region as well. Because the vehicle body or vehicle devices limit the available space, the drivable shaft, with the pivot lever having the wiper arm and mounted on it, is disposed at a great distance from the A pillar. This arrangement means that at a turning point position of the wiper lever assembly, in which the wiper arm is located close to the A pillar, there is a great distance between the inner circle of a field swept by the wiper arm and the A pillar. This leads to an uncleaned triangular window region of the A pillar, making it harder for the driver to see.

SUMMARY OF THE INVENTION

The wiper system of the invention has the advantage over the prior art that the wiper lever assembly can be disposed at only a slight distance from an A pillar or an engine hood hinge. Because of this design, it is possible to dispose the second shaft with which the second pivot lever is connected, in the immediate vicinity of a side wall of the vehicle body in the region of the A pillar or of the engine hood hinge.

To that end, the wiper lever assembly has a first pivot lever that can be coupled in a manner fixed against relative rotation to a stationary first shaft, and also has a second pivot lever that is freely rotatably about a stationary second shaft. The second shaft is accordingly not subjected to a torque but instead serves merely to guide the pivoting motion of the second pivot lever. The first and second pivot levers are each connected in articulated fashion to a coupling element. First and second joints are provided for this purpose. The wiper system furthermore has a drive device, which has a drive shaft disposed at a distance from the first and second shafts, and with the aid of this drive shaft at least one toggle link can be shifted in oscillating fashion; the toggle link is connected via a joint to a coupling part that is coupled to the first shaft in a manner fixed against relative rotation. Thus the first shaft can be acted upon by a torque, and as a result the wiper lever assembly and accordingly the wiper arm disposed on it are pivoted accordingly. Because of this design, an optimal outset (parking) position of the wiper arm, which is located outside the field of view of a vehicle passenger, for instance, and at the same time a turning point position of the wiper lever assembly in which the wiper arm is located as parallel as possible to the A pillar, can be achieved.

In an advantageous embodiment of the wiper system, the wiper arm is fastened to the second pivot lever or joined to it. The wiper arm and the second pivot lever accordingly have the same pivot axes, which coincide with the longitudinal center (rotary) axis of the second shaft. In another variant embodiment, the wiper arm is coupled to the first pivot lever, and here the pivot axis of the wiper arm is identical to the rotary axis of the first shaft.

In a further feature of the invention, the first shaft is disposed between the drive shaft and the second shaft. This allows a disposition of the second shaft at a very close spacing from the engine hood hinge, for example, or from the A pillar and at the same time a wide spacing between the drive shaft and the second shaft. The drive shaft can accordingly be disposed more toward the middle of the vehicle. The second shaft and the drive shaft are preferably located as close together as possible, for the sake of a compact design of the bearing of the second shaft, with the aid of which the second pivot lever, and the wiper arm optionally mounted on it, can be pivoted.

A preferred exemplary embodiment of the wiper system is distinguished in that the first and second joints are embodied as ball joints. This is possible because the coupling element, which connects the first and second pivot levers to one another, transmits only the motion between the two pivot levers, and the wiper arm—unlike the situation in the known four-bar wiper lever assemblies—is not disposed on the coupling element but instead is connected to one of the two pivot levers. Via the coupling elements, no moments are therefore transmitted, but only tensile and compressive forces, which can readily be withstood by ball joints without damage to the ball joints. In a variant embodiment of the wiper system, the first and second pivot levers are each provided for this purpose with a ball pin, which can be riveted on, for instance. The ball joints make it easier to put together the wiper lever assembly, since the coupling element can be clipped on in a simple way only after the mounting and optionally painting of the pivot levers and optionally the wiper arm. It is understood that it is also possible for the first and second joints to be constructed identically to the joints used in the known four-bar wiper lever assembly, but then the construction is markedly more complicated and thus more expensive than for ball joints.

In a preferred version, the rotationally fixed connection between the first pivot lever and the torque subjected first shaft is embodied separately, for instance in the form of a shaft and hub connection, cone connection, or the like. The coupling between the torque-free second shaft and the second pivot lever that is merely guided by the second shaft can also be made separable, for instance in the form of a plug-in connection.

Finally, an exemplary embodiment of the wiper system distinguished in that at least one nozzle that can be subjected to fluid under pressure is disposed on the wiper arm is preferred. The supply of fluid to the nozzle is preferably controlled such that only in an upward motion of the wiper arm, or in other words when the wiper arm is shifted out of its outset position into the viewing field of a vehicle passenger, is the fluid sprayed on the window.

Other advantageous embodiments of the wiper system will become apparent from the other dependent claims.

BRIEF DESCRIPTION OF THE DRAWINGS

The invention will be described in further detail below in conjunction with the drawing. Shown are:

FIGS. 2A–2C, each a basic sketch of the wiper system of FIG. 1, with an exemplary embodiment of a wiper lever assembly in various positions;

FIG. 3, a front view of a front window of a vehicle and a further exemplary embodiment of the wiper system.

DETAILED DESCRIPTION OF THE PREFERRED EMBODIMENTS

The wiper system 1 described below is widely usable, for instance for motor vehicles (passenger cars, trucks, buses), rail cars, or watercraft. Purely as an example, it is assumed below that it is a wiper system for a motor vehicle.

Figure 1:
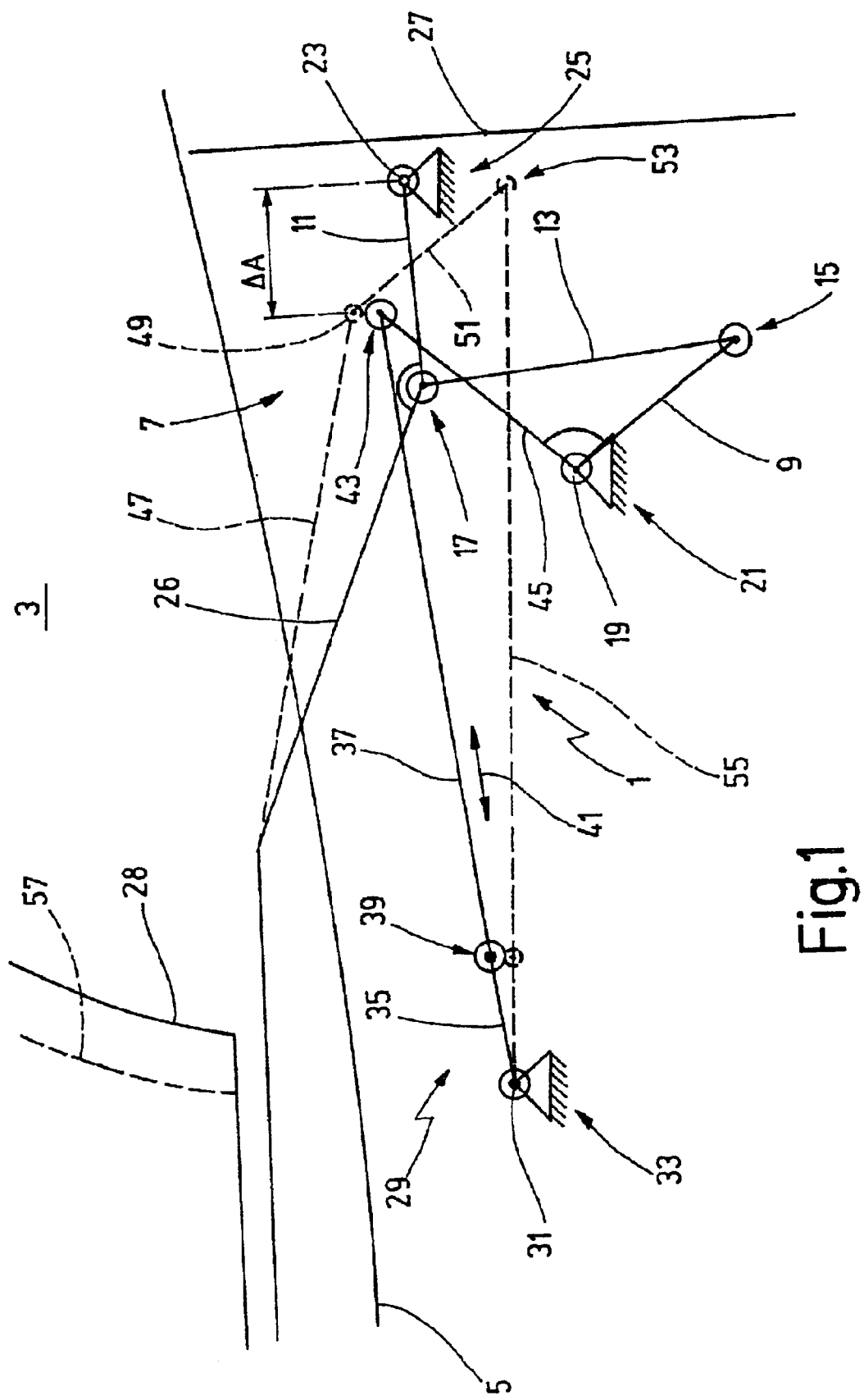
FIG. 1, a basic sketch of a first exemplary embodiment of a wiper system.

FIG. 1 shows a basic sketch of an exemplary embodiment of the wiper system 1, represented by solid lines, for a window of the vehicle, in this case a front window 3, of which only the lower edge 5 is partly visible. The wiper system 1, disposed in a region 3 located below the front window, has a wiper lever assembly 7, which has a first pivot lever 9 and a second pivot lever 11 that are connected in articulated fashion to a coupling element 13. A first joint 15 is therefore provided between the first pivot lever 9 and the coupling element 13, and a further, second joint 17 is provided between the second pivot lever 11 and the coupling element 13.

The first pivot lever 9 is connected in a manner fixed against relative rotation to a first shaft 19 of a stationary first bearing 21. The first pivot lever 11, on its end remote from the second joint 17, is freely rotatable about a second shaft 23 of a second bearing 25; that is, the second shaft 23, embodied for instance as a blind bearing shaft, serves merely the purpose of rotational guidance and optionally serves to hold the second pivot lever 11. The second shaft 23 is disposed at a very slight spacing from a body part 27 of the vehicle, such as a hinge of an engine hood, this part being merely suggested in the drawing.

From all the above it is clear that the wiper lever assembly 7 is a four-bar wiper lever assembly.

A wiper arm 26 that can be pressed against the front window 3 is fastened to the second pivot lever 11 and has an elongated base body with what in this case is an angled course. A wiper element, not shown in FIG. 1, such as a rubber wiper blade, is mounted on the wiper arm 26. In operation of the wiper system 1, the wiper arm 26 is pivoted jointly with the second pivot lever 11, guided by the second shaft 23, about a defined angular range. Because of the design of the wiper lever assembly 7, the wiper arm 26 does not execute a stroke but instead is merely pivoted, so that a field on the front window 3 in the shape of part of a circle can be swept and cleaned; of this field, only its lower edge 28 is visible in FIG. 1.

For driving the wiper lever assembly 7, a drive device 29 is provided, which includes a drive shaft 31 that can be subjected to a driving or braking moment and is part of a stationary third bearing 33. By rotation of the drive shaft 31 about its longitudinal center (rotary) axis, extending perpendicular to the plane of FIG. 1, and with the aid of a transmission member 35, a toggle link 37 is shifted in oscillating fashion in an essentially horizontal direction (double-headed arrow 41), and the toggle link 37 is connected in articulated fashion to the transmission member 35 via a third joint 39. Thus while the transmission member 35, embodied here as a lever, rotates jointly with the drive shaft 31, the toggle link 37 is shifted translationally in the direction toward and away from the wiper lever assembly 7. The toggle link 37 is connected via a fourth joint 43 to a coupling part 45, which in turn is coupled to the first shaft 19 in a manner fixed against relative rotation. In FIG. 1, dashed lines also show a known wiper system, which likewise has a four-bar wiper lever assembly whose installation space is substantially the same size as that of the wiper lever assembly 7 of the invention. The known wiper lever assembly has a wiper arm 47, which is connected to a stationary shaft 49 in a manner fixed against relative rotation. With the aid of a rocker 51, which via a joint 53 is connected to a toggle link 55 that can be shifted in oscillating fashion, the shaft 49 can be pivoted clockwise and counterclockwise. By means of the toggle link 55, a torque can be imposed on the shaft 49. For the translational shifting of the toggle link 55, a drive device is provided here, which has the same construction as the drive device 29 of the wiper system 1. In FIG. 1, only the lower edge 57 of the wiping field, which the wiper arm of the known wiper lever assembly can move across, is visible. It must be noted that the known four-bar wiper lever assembly has only one stationary bearing; the pivot axis of the wiper arm 47 coincides with the rotary axis of the shaft 49, which accordingly must be disposed at a distance from the body part 27 that is greater, by the amount of the spacing ΔA between the shaft 49 of the known wiper lever assembly and the second shaft 23 of the wiper lever assembly 7, than the spacing between the second shaft 23, about which the wiper arm 26 is pivoted, and the body part 27, because otherwise the toggle link 55 of the known wiper lever assembly would strike the body part 27.

The advantages that are obtained from the wiper lever assembly 7 compared to the known wiper lever assembly will be explained in further detail below in conjunction with FIG. 3.

In FIG. 3, which shows the front window 3 to be cleaned in front view, solid lines represent the wiping field 59, in the shape of part of a circle, that can be achieved with the wiper lever assembly 7, and dashed lines indicate the wiping field 61 that can be achieved by the known wiper lever assembly described in conjunction with FIG. 1. It can be seen that the wiping field 59 is larger, by a wedge-shaped region 63 shown shaded, than the wiping field 61. The wedge-shaped region 63 is located on the side edge of the front window 3, directly next to the A pillar, not shown, of the vehicle body. The comparison shows that for substantially the same-sized installation space, the wiper system 1 can achieve a larger wiping field with its wiper lever assembly 7 than with the conventional four-bar wiper lever assembly, and thus both safety and comfort are improved. FIG. 3 also shows that the wiper arm 26, in its turning point position, in which a change of the swiveling direction of the wiper arm 26 occurs and in which it is at its least spacing from the A pillar, is disposed essentially parallel to the A pillar, which in turn extends approximately parallel to the vehicle body 27.

The kinematics of the wiper system 1 will now be described in further detail in conjunction with FIGS. 2A–2C, which show the wiper system 1 in various instantaneous positions.

In the position shown in FIG. 2A, the wiper lever assembly 7 is in an outset position, in which the part, not shown, of the wiper arm 26, which is located in a first terminal position (FIGS. 1 and 3), essentially parallel to the lower edge 5 of the front window 3. In the outset position, the transmission member 35 of the drive device 29 and the toggle link 37 are in alignment with one another. To start the wiper cycle, in which the front window 3 is first cleaned by a clockwise pivoting of the wiper arm 26, and thus the wiping field 59 (FIG. 3) is swept by the wiper arm 26, the drive shaft 31 is subjected to driving moment, which sets the transmission member 35 jointly with the drive shaft 35 into clockwise rotation, as represented by an arrow 65 in FIG. 2A. As a result, the wiper lever assembly 7 is shifted to a extended position, shown in FIG. 2B, in which the wiper arm 26, secured to the second pivot lever 11, has already swept over a portion of the wiping field 59 (FIG. 3). The transmission member 35, rotating about the rotary axis of the drive shaft 31, then moves from the position shown in FIG. 2B into the position shown in FIG. 2C, in which it is again aligned with the toggle link 37. In the turning point position shown in FIG. 2C, the wiper arm 26 is in its other terminal position, in which it has the least spacing from the A pillar. If the transmission member 35 is rotated onward clockwise, then the wiper arm 26 is moved downward, by a pivoting of the second pivot lever 11, until the wiper arm has reached its first terminal position and the wiper lever assembly has reached its outset position. During the downward motion of the wiper arm 26, the wiper lever assembly briefly resumes the extended position shown in FIG. 2B.

It must be noted that the drive shaft 31 during one wiping cycle rotates solely in a single direction, and the speed of rotation is preferably constant, so that a uniform motion of the wiper arm 26 is achieved.

Figure 4:
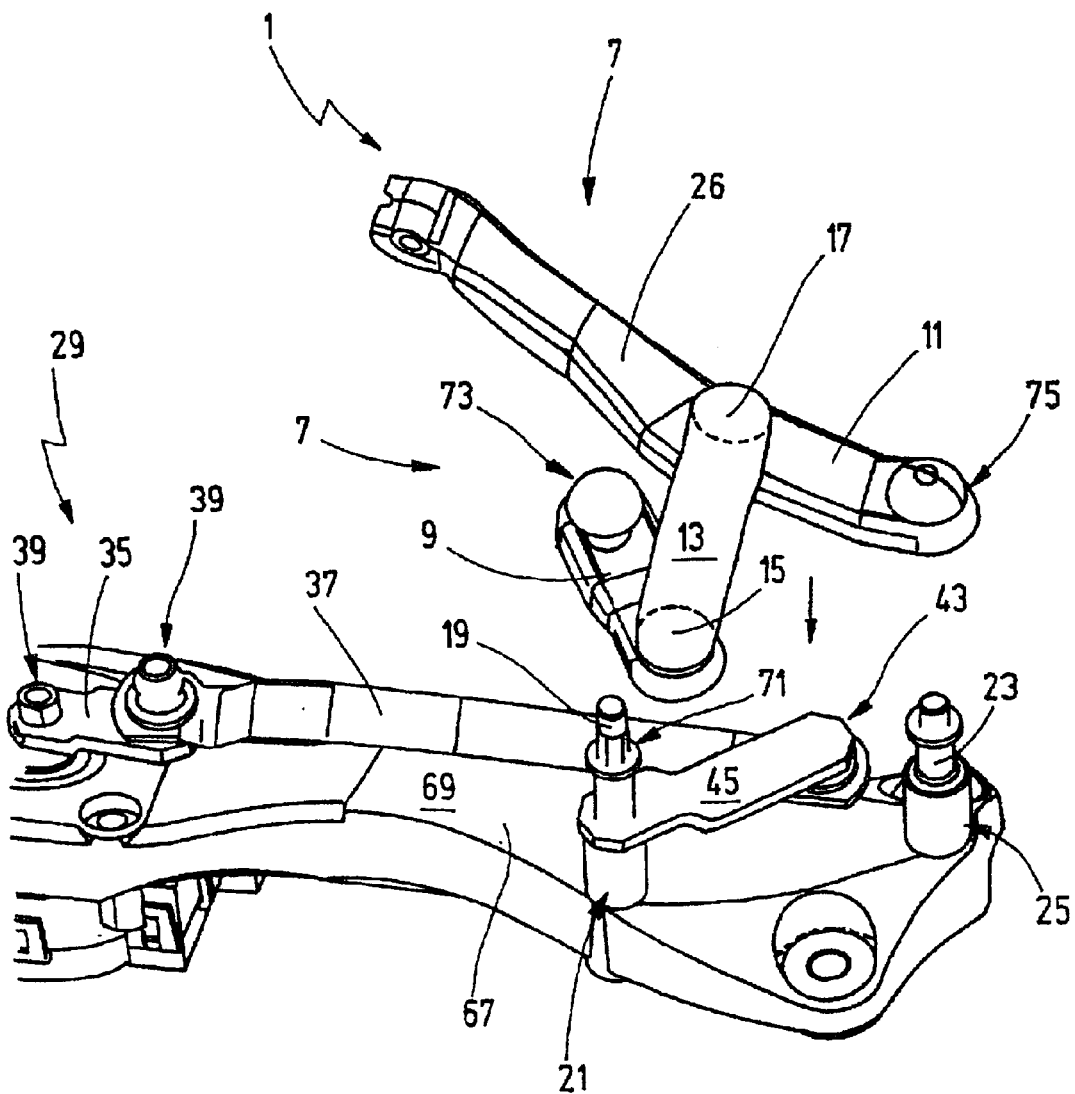
FIG. 4, a perspective view of a further exemplary embodiment of the wiper system.

FIG. 4 shows a perspective view of an exemplary embodiment of the wiper system 1. Identical elements are identified by the same reference numerals and in this respect reference can be made to the description of the preceding drawing figures.

FIG. 4 shows that the wiper lever assembly 7, shown in the state in which it is lifted away from the drive device 29, forms a structural unit that can be preassembled; this unit includes the first pivot lever 9 and the second pivot lever 11, with the wiper arm 26 attached to it, and the coupling element 13 connected in articulated fashion to the first and second pivot levers 9, 11.

The drive device 29 is secured to a bracket 67, which is preferably embodied as a die-cast part. In another exemplary embodiment, not shown, the bracket is made from plastic, preferably by an injection molding process. The first and second bearings 21, 25 are embodied integrally with the bracket 67 here. The rotationally fixed connection between the first pivot lever 9 and the first shaft 19, the latter disposed substantially perpendicular to a top 69 of the bracket 67, is achieved in this exemplary embodiment by means of a hexagonal connection 71, onto which the first pivot lever 9 can be slipped with a recess 73, not otherwise shown. Alternatively, the rotationally fixed connection between the first pivot lever 9 and the first shaft 19 can be done by means of a positive engagement, for instance. To that end, the shaft 19 can be embodied as a "standard shaft", which has a knurled cone that cooperates with a correspondingly embodied recess on the first pivot lever. The second pivot lever 11 can be slipped with a recess 75, not shown in further detail, onto the second shaft 23 that extends substantially parallel to the first shaft 19; the recess 75 is adapted to the second shaft 23 in such a way that the second pivot lever 11 is freely rotatable about the fixed second shaft 23.

It becomes clear that the wiper lever assembly 7 can also be joined in a simple way to the drive device 29 retroactively, once the drive device 29 has already been mounted on the bracket 67 that in turn can be connected to the vehicle body.

In an advantageous exemplary embodiment, at least the first and second pivot levers 9, 11 are embodied as die-cast or bent sheet-metal parts.

A particular advantage of the wiper system 1 is that the rotary axis of the wiper arm 26, or in other words the second shaft 23, is embodied as a blind bearing shaft; that is, no torques are transmitted via the second shaft 23. Because of this design, the second bearing 25 can be made low in height.

In a suitable design of the second pivot lever 11, or of a covering mounted on it and made for instance of plastic, a hood gap between the engine hood and the front window 3 can be concealed in an attractive way. A low-height construction of the wiper arm 26 is also possible, so that wind noise caused by relative wind is only relatively slight.

The design of the wiper lever assembly 7 and that of the drive device 29 make it possible to accommodate the entire wiper system 1 under the engine hood, so that there is no effect on the visual appearance of the vehicle.

The design of the wiper lever assembly 7 described in conjunction with the drawings here also makes it possible to use parts of the drive device of the known four-bar wiper lever assembly; the parts of the drive device can be either adopted identically or optionally adapted to the wiper lever assembly 7, for instance by a change of length.

I claim:

1. A wiper system (1) for vehicles, comprising:

a wiper-ever assembly (7) that has at least one wiper arm (26), wherein the wiper lever assembly has a first pivot lever (9), which can be coupled in a manner fixed against relative rotation to a stationary first shaft (19), and a second pivot lever (11), which is freely rotatable about a stationary second shaft (23), wherein the first pivot lever (9) is connected via a first joint (15) and the second pivot lever (11) is connected via a second joint (17) to a coupling element (13); and a drive device (29) having a drive shaft (31), disposed at a distance from the first and second shafts (19, 23), wherein with the aid of the drive shaft at least one toggle link (37) can be shifted in oscillating fashion, wherein the toggle link (37) is connected via a joint (43) to a coupling part (45) that is coupled to the first shift (19) in a manner fixed against relative rotation, wherein a spacing between the first and second shafts is less than a spacing between the drive shaft and the first shaft.

2. The wiper system of claim 1, wherein the second shaft (23) is disposed directly next to an A pillar of the vehicle body and/or an engine hood hinge.

3. The wiper system of claim 1, wherein the first shaft (19) is disposed between the drive shaft (31) and the second shaft (23).

4. The wiper system of claim 1, wherein the wiper arm (26) can be fastened to one of the pivot levers (9; 11).

5. The wiper system of claim 1, wherein the first and second joints (15; 17) are embodied as ball joints.

6. The wiper system of claim 1, wherein the rotationally fixed connection between the first pivot lever (9) and the first shaft (19) and/or the connection between the second shaft (23) is separable.

7. The wiper system of claim 1, wherein at least one nozzle that can be acted upon by a fluid under pressure is disposed on the wiper arm (26).

8. The wiper system of claim 1, wherein the first and second pivot levers (9; 11) are embodied as die-cast or bent sheet-metal parts.

* * * * *